Sept. 18, 1923.

J. A. SCHILD 1,468,170

AUTOMATIC STOP FOR PHONOGRAPHS

Filed March 5, 1921  3 Sheets-Sheet 1

INVENTOR.
JOHN A. SCHILD.

BY

ATTORNEYS.

Patented Sept. 18, 1923.

1,468,170

UNITED STATES PATENT OFFICE.

JOHN A. SCHILD, OF VINCENNES, INDIANA, ASSIGNOR TO LUCIUS R. HENLEY, OF VINCENNES, INDIANA.

AUTOMATIC STOP FOR PHONOGRAPHS.

Application filed March 5, 1921. Serial No. 450,068.

*To all whom it may concern:*

Be it known that I, JOHN A. SCHILD, a citizen of the United States, and a resident of Vincennes, county of Knox, and State of Indiana, have invented a certain new and useful Automatic Stop for Phonographs; and I do hereby declare that the following is a full, clear, and exact description thereof, reference being had to the accompanying drawings, in which like numerals refer to like parts.

This invention relates to automatic stopping devices for talking machines and the like wherein the device is adapted to stop the rotation of the record after the needle or record groove engaging means has reached the end of the record groove. In common with other similar devices in the prior art, the present invention depends upon the relative movement of the record supporting means and the needle or record engaging means.

The chief object of this invention is to provide a unitary device which may be readily attached to a talking machine by a novice and which will be automatically operable by the parts of said machine in the usual operation thereof.

Another object of the device is to construct the same such that said device will not interfere with the operation of the record rotating means when it is desired to play a record until the same has been played. It is also desirable to prevent the operation of the device until the record groove engaging means has moved to the record groove engaging position and is moving with the record.

The chief feature of the invention consists in associating a device of the character indicated with means operable by the tone arm, which tone arm operable means automatically releases the device into operative relation with the talking machine when a record is to be played, and which after operation automatically locks the device until the talking machine is to be again operated.

Another feature of the invention consists in the interlocking arrangement of the several mechanisms comprising the device such that the device will not be actuated in the initial or initiatory movement of the talking machine parts in playing a record.

Still a further feature of the invention consists in the provision of suitable means for limiting the movement of the several mechanisms in the device such that the same will be automatically operated when said limit of movement is obtained.

Another feature of the invention consists in the adjustability of the several parts engageable or operable by the talking machine to the talking machine.

The full nature of the invention will be understood from the accompanying drawings and the following description and claims.

In the drawings there are shown two modifications of the invention. Other forms of the invention may be readily conceived without departing from the broader features thereof and which will utilize the several combinations herein illustrated.

Figures 1, 4:
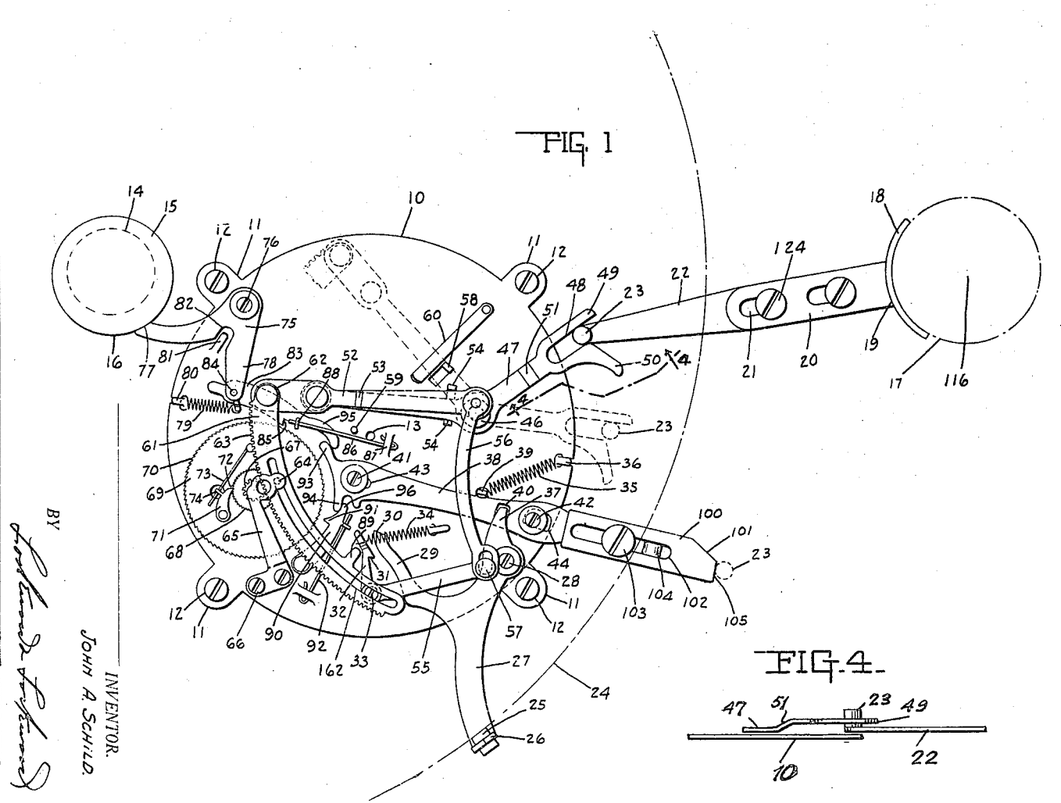
Fig. 1 is a plan view illustrating one form of the invention, parts being herein shown substantially full size and in operative or record stopping position.
Fig. 4 is an elevational view taken along the line 4—4 of Fig. 1.
Figure 2:
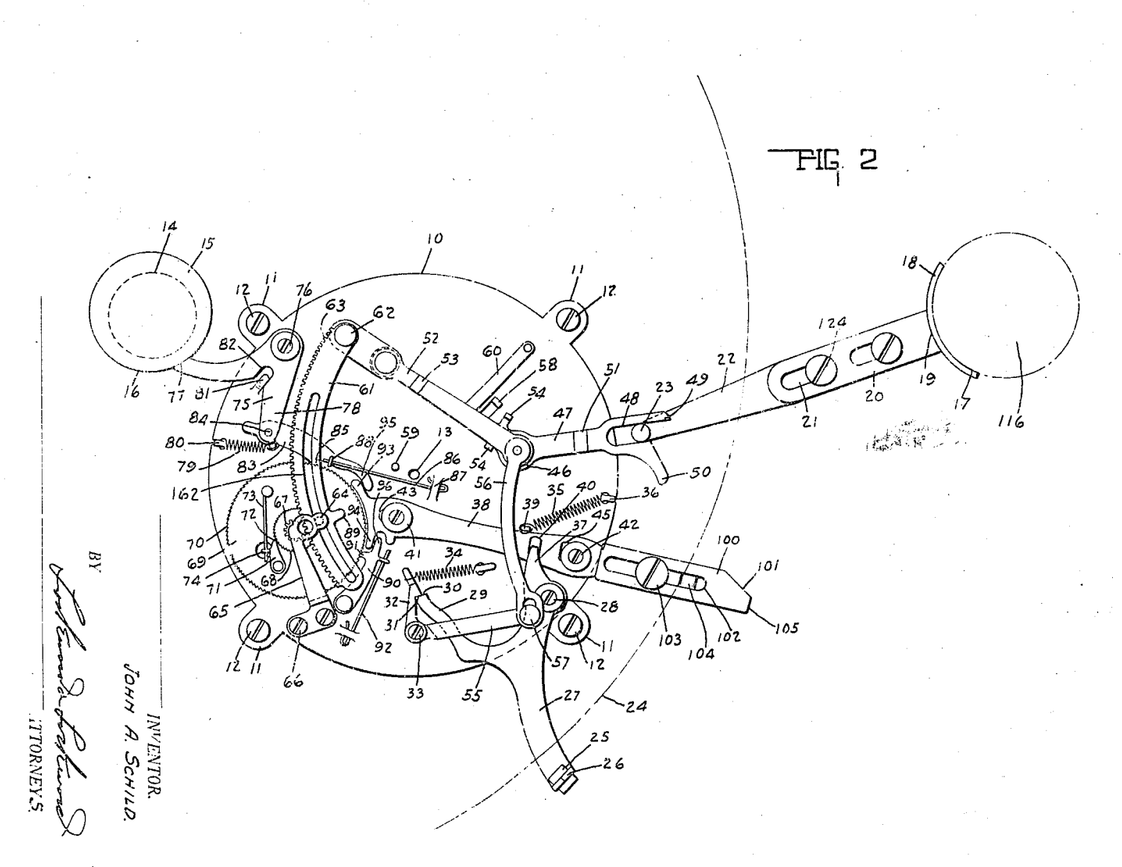
Fig. 2 is a similar view of the same parts shown in Fig. 1 and shows said parts in an intermediate position wherein the stopping mechanism is non-operative but is functioning.

In the drawings 10 indicates a supporting base plate which is provided with a plurality of radially extending ears 11 which are perforated at 12 to receive suitable means for attaching the device to the talking machine. A suitable cover plate herein not shown is also provided, and said cover plate may be suitably secured to the base plate in any desirable manner or by means of a bolt or screw associated with a central opening 13. There is illustrated in the drawings but three portions of a standard talking machine, which is of the disk type. Herein 14 illustrates a shaft which is rotatable in timed relation with the record, and in the present invention as illustrated in Figs. 1 and 2, said shaft may be considered to be the shaft upon which the disk supporting plate is mounted. Upon the shaft 14 there is secured an eccentric sleeve 15 with a high portion 16 for reciprocating suitable pawl means associated with suitable gear means. 116 indicates the pivotal point or center upon which is rotatably mounted the tone arm carrying the diaphragm and needle, or record groove engaging means, and said arm is indicated by the numeral 17. Suitably secured to the arm 17 is an arcuate portion 18 provided with a depending portion 19 from which there extends a lateral portion 20 provided with a plurality of elongated slots 21. Associated with the lateral portion 20 is a finger or arm portion 22 carrying upon its free end a cylindrical block or projection 23. The arm portion 22 is adjustably but rigidly secured to the arm portion 20 by suitable means such as the flat headed screw bolts 124 extending through the slots 21. It will, of course, be understood that the arcuate portion 18 of the actuating arm may be suitably secured to the tone arm by any suitable or preferred means herein not shown. The record, and in this instance the disk record supporting plate means, is illustrated by the numeral 24 and associated with said plate is a suitable brake shoe 25 carried by an upwardly extending portion 26 of a lever 27 which is pivotally supported upon the plate 10 at 28. The lever 27 is bifurcated and one end 29 is provided with a tooth 30 which is adapted to engage in a notch 31 of a pivoted catch 32 which is also pivotally supported upon the plate 10 at 33. Suitable tension means, such as the coiled spring 34, engages the end of the catch lever 32 and yieldingly retains the tooth 30 and catch 31 in locking engagement so as to maintain said lever 27 in the position shown in Fig. 2 in opposition to a main actuating spring 35 secured to a finger portion 36 which is preferably punched upwardly from the plate 10. The spring 35 is connected to a controlling bar 38, which controlling bar carries a spring retaining lug 39. The bar 38 is provided with an elongated slot 40 in which is seatable the downwardly and angularly extending end of the extension 37 of the lever 27. Thus, movement of the bar 38 will be transmitted to the lever 27 and by means of the spring 35, said lever 27 will be tilted upon its pivot 28 so as to bring the brake shoe 25 into engagement with the disk supporting plate 24 when the tooth 30 is disengaged from the catch 31.

It will, of course, be understood that since movement of the lever 27 is secured through the bar 38, said bar controls the brake shoe and intermediate means. Thus, a plurality of guide pins 41 and 42 are provided, and said bar is provided with adjacent slots 43 and 44 so that said pins slidably support the bar 38 upon the plate 10, and since the slot 44 is widened as shown at 45, see Fig. 2, said bar is adapted to have slight pivotal movement about the center approximately that of the pivot 41 so as to tilt the lever 27 when the spring 35 is effective through the release of the latch portions 30 and 31.

Pivotally supported upon the plate 10 at 46 is a lever 47 having an outwardly extending portion which is bifurcated at 48 to provide a slot between an elongated end 49 and an angularly extending end 50. It will be readily perceived from the drawings that the slot between the bifurcated arms 49 and 50 is adapted to receive the cylindrical portion 23, and since said arm of the lever 47 is offset at 51, the body portion of the arm 22 will pass beneath, if necessary, the arm portion 50 in the return movement of the tone arm 17. There is illustrated by dotted lines in Fig. 1 the initial position of the lever 47, and it will be noted that the cylinder 23 is adapted to engage upon the guiding arm 50 and seat itself in the slot adjacent thereto and be retained in said slot by the elongated arm portion 49 so that movement of the tone arm will be transmitted to the lever 47 so that said lever 47 will be turned on its pivot 46 and carried therewith, and the mechanism associated with the lever. Upon the interior free end of the lever 47 there is pivotally supported another lever 52 intermediate the ends of said last mentioned lever 52. The lever 52 is offset at 53 and extends substantially parallel to the lever 47 and terminates adjacent the pivotal support 46 of the lever 47. There is suitably secured to and preferably integral with the lever 47 a pair of retaining guides 54 which provide that the lever 52 will have limited movement therebetween, as shown clearly by the different positions of said lever, as illustrated in Figs. 1 and 2. The lever 52, it will be here noted, is provided to release the tooth 30 from engagement with the latch 31 by the lever 32 being a bell crank lever, the other end of which is herein designated by the numeral 55. The end of the lever 52 adjacent the pivotal support 46 is pivotally connected to a link bar 56, the other end of which is connected to the free end of the bell crank lever 55 by means of a pin and slot connection 57. Thus, movement of the lever 52 will be transmitted through the link bar 56 and bell crank 55 to release the latch 31 from engagement with the tooth 30 in opposition to the spring 34. Since the bar 38 is slidably mounted, the aforesaid release of the latching engagment will cause the spring 35 to tilt the lever 27 upon its pivot 28 and cause the brake shoe 25 to engage the periphery 24 of said record supporting disk plate in the usual manner. Suitable means, such as the elevation or projection 58 punched from the bottom plate 10, serves to limit the movement of the lever 47 in one direction, and a stop pin 59 or other means punched from the plate 10 limits the pivotal movement of the lever 47 in the other direction. Said limit pins or projections 58 and 59, it will, of course, be understood provide for sufficient arcuate movement of the lever 47 such that the range is sufficient to accommodate the largest range of movement of the tone arm when associated with the largest record to be played. A spring 60 may be secured at one end to the plate 10 by being riveted thereto, or said spring may be punched from the plate and formed as an integral part thereof. Said spring is adapted to be positioned adjacent the stop pin 58 and receive and yieldingly retain one arm of the lever 47 when said arm is in the dotted line position shown in Fig. 1, which is considered as the initial or starting position and corresponds to the position of the record groove engaging means when said means is non-engageable with the record. The projection or pin 59 is provided to limit the movement of the pivotal lever 47 when the record engaging means and tone arm have reached the end of the record groove. This stop pin positively prohibits and prevents the record groove engaging means from traversing the opposite side of the record or passing through the center thereof, for the device will operate to stop the rotation of the record when said lever 47 engages the pin 59.

The means associated with the lever 52 pivotally supported upon one end of the lever 47 comprises a rack, and in the present instance an arcuate rack 61 pivotally connected at 62 to the opposite end of the lever 52 hereinbefore described. The other end of the arcuate rack is free and between said ends is an arcuate guide slot 162 concentric with the teeth 63 of said rack and having the center substantially that of the pivot 46 or the adjacent pivotal connection between the lever 52 and link bar 56. A suitable guide pin 64 in the present instance is shown supported upon an upwardly and angularly extending bracket arm 65 suitably secured at 66 to the plate 10. However, any suitable guide means supported upon the plate 10 may be associated with the rack bar in order to align the same with respect to a pinion 67 which is provided with a ratchet wheel 68 rotatably mounted upon a pivot not shown which is supported on the plate 10. A ratchet wheel 69 provided with ratchet teeth 70 upon the periphery thereof is also rotatably mounted upon the pivot hereinbefore referred to, and, therefore, said ratchet wheel 68 and the pinion 67 are concentric with the ratchet 69. Upon the face of the ratchet 69, there is secured, see Fig. 2, a dog 71 having a toothed portion 72 for engagement with the teeth of the ratchet wheel 68. A spring 73 has one end secured to the ratchet wheel 69 and the other end is secured to the dog 71 at a projecting portion 74 such that said dog will normally be maintained in yielding engagement with the ratchet wheel 68 so that rotation in one direction of the wheel 69 will rotate the pinion 67, and, therefore, move the rack 61 from the dotted position shown in Fig. 1 to the full line position. The rack 61 may also be independently moved by the arms 20 and 22 engaging the lever 47 as hereinbefore described and as illustrated in the dotted lines in Fig. 1 and the full lines in Fig. 2 to move said rack counter-clockwise into the position shown by the full lines in Fig. 1. However, when said rack 61 is moved clockwise by means of the tone arm 17 by the connections hereinbefore described and the disk record plate is not rotated by the usual means, the rack 61 in engagement with the pinion 67 will be moved clockwise without affecting any of the mechanisms associated therewith, since the dog 71 and ratchet wheel 68 provide for the overrunning movement of said gear wheel and said rack with respect to the ratchet 69. From the foregoing it will be evident that when the tone arm associated with the arm 20 engages in the last groove of the record, said arm will stop moving, and, therefore, the lever 47 will not be moved; yet since the disk record is rotated by suitable means and said rotation is transferred to the wheel 69 by means hereinafter to be described, it will be understood that said movement of the wheel 69 is transmitted to the rack 61 to move the same upon the pivotal support at the free end of the lever 47, thereby moving said lever 52 with respect to the lever 47 so that the link bar 56 and bell crank 32 will be actuated, as shown by Figs. 1 and 2, to release the latching engagement of the tooth 30 to project, by means of the spring 35, the brake shoe 25 into engagement with the record supporting plate 24, as previously described. Thus, the mechanism is adapted to operate when the tone arm has stopped operating and will not operate when both the tone arm and record plate are rotating; or when both have stopped rotating, since it is the relative movement between said parts which causes the bell crank 32 to be rocked upon its pivot 33 to release the mechanism to braking operation.

Figure 3:
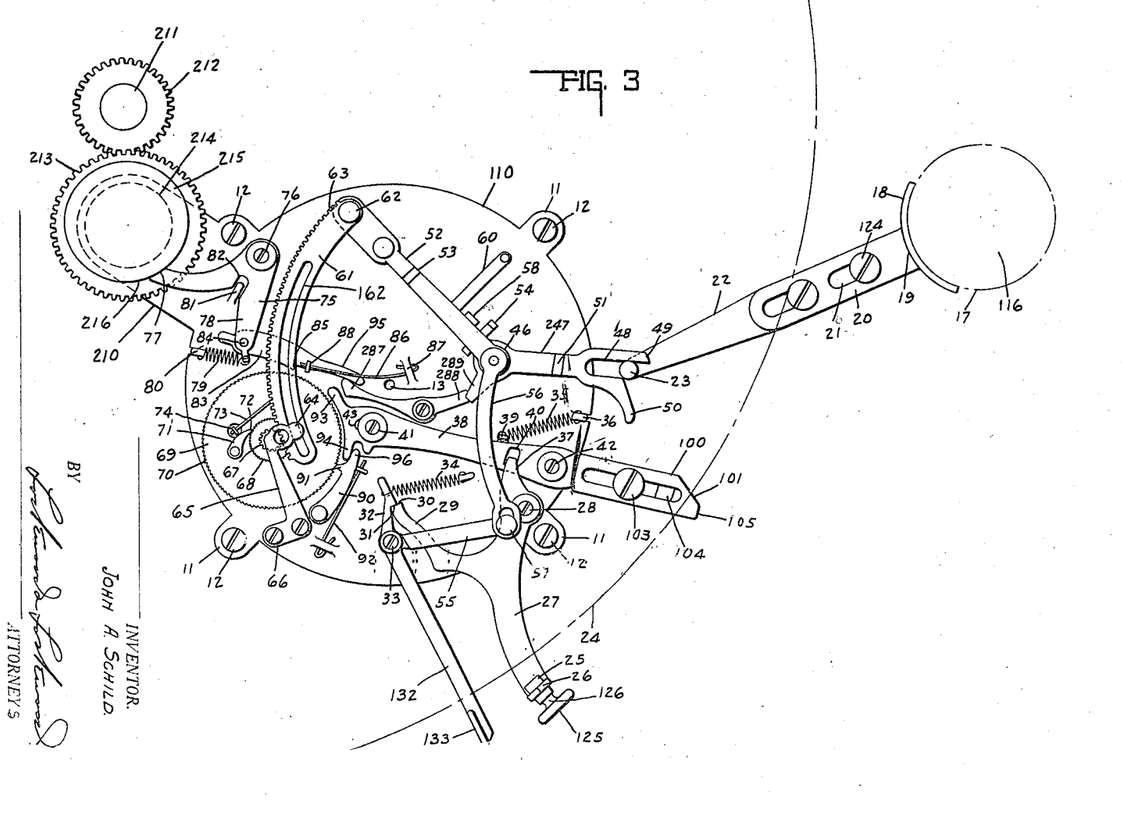
Fig. 3 is a plan view of a modified form of the invention, parts being shown in a position substantially the same as Fig. 2.

The means for transmitting the motion of the record rotating mechanism to the gear wheel 69 comprises the shaft 14, the detachable sleeve 15 provided with the eccentric portion 16 and suitable connecting means between said eccentric and operable thereby and the gear wheel 69. In Figs. 1 and 2 there is illustrated one form of the connection; while in Fig. 3 is illustrated a modified form of the connection. It is to be understood that the connection between these parts is substantially similar in the present instance, and that of the modification shown in Fig. 3 differs from that shown in Fig. 2 by the addition of an intermediate gear train, the function of which will be hereinafter explained. The similar parts will now be described and consist of a bell crank 75 pivotally supported at 76 upon the plate 10. One end of the bell crank 75 is provided with a beveled face 77 engageable by the cam portion 16 such that the eccentric face thereof is adapted to tilt said bell crank upon its pivot. The other end 78 of the bell crank 75 is connected with one end of a coiled spring 79, the other end of which is secured at 80 to the plate 10 by means of a punched support or hook formed from said plate. A suitable punching 81 is positioned intermediate the arms of the bell crank 75 and limits the outward and inward movement of said bell crank since the latter is provided with a suitable slot 82 in which the stop or limit punching or projection 81 is positioned. A pawl 83 is pivotally supported at one end 84 upon the end 78 of the bell crank 75, and said pawl is provided with a tooth 85 which is adapted to engage the ratchet teeth 70 on the wheel 69. A suitable spring 86 having one end suitably secured at 87 to the base plate 10 is secured at its other end to the pawl 83 by a projecting portion 88. The projecting portion 88 in the form of the invention shown in Figs. 1 and 2 cooperates with a lug or finger 89 integral with the rack 61. Thus, when the rack as shown by the dotted lines in Fig. 1 is moved into the initial or starting position, said finger 89 engages the projection 88 and maintains the pawl out of engagement with the wheel 69 until such time as the tone arm has moved said arcuate rack into operative relation with the pinion 67 and is moving with the rotation of the record. Thus, the device is not maintained in an operative relation until such time as both the tone arm 17 and the record plate 24 are rotating in unison. If the foregoing means were not provided, the following would frequently occur. The mechanism would be tripped and the brake 25 applied before the tone arm would start to move in unison with the record plate 24. The means for preventing reverse rotation of the gear wheel 69 when the same is to be rotated by the pawl 83 comprises a dog 90 pivotally supported upon the plate 10 and having a tooth 91 for engagement with the teeth 70 of the wheel 69. This provides that the pawl 83 may be retracted after it has advanced the wheel the desired number of teeth. The ratchet dog 90 is maintained in yielding engagement with the wheel 69 by a light spring 92 suitably supported at one end upon a punching formed in the plate 10, and at the other end is supported in abuttable relation to the end 94 of the bar 38.

In the present invention, means is provided for preventing the operation of the pawl 83 and for the retraction of the dog 90 into non-operative position, until such time as the device is again desired to be operated. Upon the lower free end of the slidable bar 38 is provided two oppositely and arcuately extending projections 93 and 94. The projection 93 cooperates with a similar projection 95 formed integral with an extension of the pawl 83; while the projection 94 cooperates with a similar projection 96 formed integral with an extension of the dog 90. Thus, when the lever 27 is released into the braking position, the projections 93 and 94 remove the pawl 83 and dog 90 into an inoperative position and maintain the same therein, since said bar is maintained in the projected position by means of the spring 35. It will, of course, be understood that the spring 35 is of sufficient strength to maintain said bar in the position indicated in Fig. 1 in opposition to the springs 79, 86 and 92, all of which cooperate with the pawl 83 and the dog 90.

In Fig. 3 there is illustrated a modified form of the invention in which the same parts are indicated by some of the similar numerals, and many other parts substantially similar to the parts illustrated in Figs. 1 and 2 are indicated by the numerals increased by 200. Thus, integral with the plate 110 or detachably secured thereto is a bracket 210 which rotatably supports a shaft or spindle 214. The shaft or spindle 214 carries a sleeve 215 upon which is rigidly secured a gear wheel 213 in mesh with another gear wheel 212 carried upon a shaft 211, which shaft is rotatable by the rotating means associated with the disk supporting plate 24. Also secured to the sleeve 214, and preferably integral therewith, is an eccentric cam 215 provided with the cam surface 216 adapted to engage the beveled edge 77 of the bell crank 75 to actuate the pawl 83. The foregoing mechanism is provided so that the device may be more easily adjusted to any talking machine, since the cam, bell crank and pawl connection are adjusted to the rack connection hereinbefore described, which means are adjusted when the parts are assembled.

Fig. 3 also illustrates a modified form of the locking arrangement, and in the present instance the lever 47 is replaced by a lever 247 provided with a locking projection 289 integral therewith. This projection 289 corresponds to the projection 89 formed on the rack 61, as illustrated in Figs. 1 and 2. Cooperating with the projection 289 is a pivotally supported locking lever 288 having a notched end engageable by the projection 289. The notched end 288 corresponds to the projection 88 on the pawl 83. A projecting portion 287 engages with the projecting portion 95 to maintain the pawl 83 out of engagement with the wheel 69 when the lever 247 is moved to the initial or starting position. Thus, until the lever 247 is moved by the tone arm to release the end 288 from engagement with the projection 289, said pawl 83 will be maintained out of engagement with the wheel 69; and when said tone arm has moved a sufficient distance, said locking lever will be released, thereby permitting the spring 86 to project the pawl 83 into operative engagement with the wheel 69 to rotate the latter. It will, of course, be understood that the projection 93 cooperates with the end 287 of the locking lever to maintain said pawl 83 out of engagement as hereinbefore described, while the projection 94 through the projection 96 also maintains the dog 90 out of engagement with said wheel when the bar 38 is in the retracted position and maintained in said position by means of the spring 35.

In the present invention, there is provided a setting attachment, and said setting attachment comprises an adjustable cam plate 100 having a beveled surface 101 and an elongated slot 102. Associated with the slot 102 is an adjusting screw 103, and carried by the bar 38 is a projecting portion 104. The screw 103 and projection 104 cooperate with the guide slot 102 and adjustably secures said plate 100 to the bar 38. It will be understood that the bar 38, as hereinbefore described, is slidably supported upon the pins 41 and 42, and two positions of said bar are illustrated in Figs. 1 and 2, wherein Fig. 1 illustrates the retracted position of said bar, and Fig. 2 indicates the initial or projected position of the bar. When the tone arm is moved into operative engagement such that the needle engaging means engages the record groove, the cylindrical cam 23 engages the outer end 105 of the plate 100 and projects said bar in opposition to the spring 35 into the position shown in Fig. 2. This movement releases the pawl 83 and dog 90 into operative engagement with the gear wheel 69. Said movement also tilts the lever 27 upon its pivot and retracts the brake shoe 25 from engagement with the plate 24, as well as projects the tooth 30 into locking engagement with the latch 31. It will, of course, be understood that in both modifications shown, the pawl 83 is also maintained out of operative engagement by the interlocking means. In Figs. 1 and 2, the projecting finger 89 and projection 88; and in Fig. 3 the projection 289 and lever 288 maintain the pawl 83 out of engagement with the wheel 69 until such time as the arcuate rack 61 through the lever 47 or 247 is moved by the movement of the tone arm a sufficient distance such that the record is being played. If it were not for this interlocking connection, it would frequently happen that the device would operate the brake before the tone arm started to move, as heretofore explained, since said device is constructed to move upon the differential movement between the tone arm and the record supporting disk plate.

The movement of the tone arm from the non-record engaging position into the record engaging position causes the cylindrical cam 23 to engage the outer end 105 of the bar and project said bar 38 into the starting position. Further movement of the tone arm carries the cylindrical cam from the position shown in Fig. 1 to the dotted line position shown in Fig. 1, where the cylindrical cam 23 engages the Y-shaped or forked end of the arm 47 and moves said arm with the movement of the tone arm. This movement also moves the rack. It will, of course, be understood that upon the release of the brake 25 by the projecting of the bar 38 and the release of the pawl 83 into operative engagement with the wheel 69, the movement of the record rotating member will be transmitted to the gear wheel 69 and also cause said gear wheel to move the arcuate rack. Should the record rotating means stop, it will, of course, be understood that the movement of the tone arm also stops, and, therefore, the stop mechanism herein provided does not operate since the same is not necessary. When the tone arm has reached the end of its movement as determined by the end of the groove upon the record being played, the tone arm serves to hold the lever 47 or 247 and acts as a drag for a sufficient amount to accomplish further movement of the arcuate rack through the rotating connection associated with the record rotating means which further movement tilts the bell crank lever 32 to release the brake mechanism so that the spring 35 will cause said brake shoe 25 to engage the record supporting plate 24 and stop the rotation of said record. The release of the brake mechanism also through the spring 35 and bar 38 moves the interlocking projections hereinbefore described into the locking positions, and, therefore, the tone arm when moved to the initial or starting position is adapted to freely rotate the pinion 67 and wheel 69 from the positions shown in the several figures into the initial or starting position indicated by the dotted lines in Fig. 1. Continued movement of the tone arm to the initial starting or inoperative position after a record has been played engages the cam face 101 of the plate 100 and moves the bar 38, this movement being accommodated by the elongations in the slots 40, 43 and 44.

Said movement is also shown dotted in Fig. 1. It will readily be understood that suitable means may be associated with the mechanism connected with the bell crank 32, or means may be connected with said bell crank such that said bell crank 27 may be manually moved at any time to release the brake shoe into braking engagement with the record rotating means. Such means is illustrated in Fig. 3 of the drawing. It is also desirable to provide a manual engageable portion such that when the beforementioned manual tripping means is actuated, the brake shoe and the bar 38 may be reset by manual engagement so that the playing of the record can be finished.

Herein such manual tripping and resetting means is illustrated in Fig. 3, wherein the lever 32 is provided with an extension 132 having a finger engageable portion 133. Movement of the portion 133 from the position shown towards the brake will rock the latch 32 and release the brake shoe and associated mechanism, including the controlling bar 38 to the action of the spring 35. An extension 126 of the lever 27 terminates in a finger portion 125, whereby the lever 27 may be moved into non-braking position and bar 38 moved to the non-locking position.

The operation briefly is as follows: Pressure upon the projecting end of the bar 38 (in opposition to the spring 35) moves the brake lever 27 into non-braking position, whereupon it is latched by the lever 55 through the spring 34. The bar 38, when depressed, also permits the dog 90 and the pawl 83 to engage the wheel 69. Subsequent engagement with the lever 47 by the tone arm operable arm 22 moves the arcuate rack 63 counterclockwise. The wheel 69 is rotated by the disk rotating means and after the tone arm has stopped moving, said wheel 69, through the pinion 67, continues the counter clockwise movement of the rack 63. Since the rack 63 is carried by the lever 52 in turn pivotally supported on the lever 47, relative movement between the lever 52 and lever 47 is secured. This is possible since the lever 47 is held stationary during the subsequent movement through the stationary tone arm. This relative movement moves the bell crank 55 to release the brake lever 27 through the operation of the spring 35. This spring 35, therefore, as soon as the latch is removed from the brake lever 27, also moves the lock and re-setting bar into the locking position preparatory to re-setting and releasing of the brake.

While the invention has been described in the foregoing specifications in great detail, the same is to be considered as illustrative rather than restrictive in character. In the foregoing specifications a plurality of modifications have been illustrated and other modifications have been suggested. These modifications, as well as others which will readily suggest themselves to those skilled in the art to which this invention applies, it is to be understood, are all considered to be within the broad purview of the invention, as outlined by the appended claims.

The invention claimed is:

1. An automatic stopping device for talking machines including a brake, means for operating said brake and automatically operable by the difference in movement of the tone arm and the rotation of the record, and means for positively operating said brake upon the failure of the tone arm to stop moving at the end of the record.

2. An automatic stopping device for talking machines including a brake, means for operating said brake and automatically operable by the difference in movement of the tone arm and the rotation of the record, means for preventing the operation of said brake until the tone arm has started to move with the rotation of the record, and means for positively operating said brake upon the failure of the tone arm to stop moving at the end of the record.

3. An automatic stopping device for talking machines including a brake, means for operating said brake and automatically operable by the difference in movement of the tone arm and the rotation of the record, means for positively operating said brake upon the failure of the tone arm to stop moving at the end of the record, manual means for actuating said brake, and manual means for resetting said brake in non-braking relation.

4. An automatic stopping device for talking machines including a brake, means for operating said brake and automatically operable by the difference in movement of the tone arm and the rotation of the record, means for preventing the operation of said brake until the tone arm has started to move with the rotation of the record, means for positively operating said brake upon the failure of the tone arm to stop moving at the end of the record, manual means for actuating said brake, and manual means for resetting said brake in non-braking relation.

5. In a talking machine, the combination with a tone arm, a record rotating means, and a unitary and detachably stopping mechanism therefor, of adjustable means operatively connecting said tone arm and said stopping mechanism, and a power connection between said record rotating means and said stopping mechanism.

6. In a talking machine, the combination with a tone arm, a record rotating means, and a unitary and detachable stopping mechanism therefor, of means operatively connected to said tone arm and said stopping mechanism, and a detachable power connection between said record rotating means and said stopping mechanism.

7. In a talking machine, the combination with a tone arm, a record rotating means, and a unitary and detachable stopping mechanism therefor, of adjustable means operatively connecting said tone arm and said stopping mechanism, and a detachable power connection between said record rotating means and said stopping mechanism.

8. In a talking machine, the combination with a tone arm, a record rotating means, and a unitary and detachable stopping mechanism therefor, of adjustable means operatively connecting said tone arm and said stopping mechanism, a power connection between said record rotating means and said stopping mechanism, and an adjustable control included in said detachable stopping mechanism.

9. In a talking machine, the combination with a tone arm, a record rotating means, and a unitary and detachable stopping mechanism therefor, of means operatively connecting said tone arm and said stopping mechanism, a detachable power connection between said record rotating means and said stopping mechanism, and an adjustable control included in said detachable stopping mechanism.

10. In a talking machine, the combination with a tone arm, a record rotating means, and a unitary and detachable stopping mechanism therefor, of adjustable means operatively connecting said tone arm and said stopping mechanism, a detachable power connection between said record rotating means and said stopping mechanism, and an adjustable control included in said detachable stopping mechanism.

11. An automatic stopping device for talking machines including a pivotally supported lever operable by the tone arm and movable therewith, an arcuate rack pivotally supported on said lever at a distance from the pivotal support of said lever, a brake for said machine associated with said arcuate rack, said rack having a center approximately coinciding with said first mentioned pivotal support, and means operative between said center and said brake, said center being movable to operate said brake.

12. An automatic stopping device for talking machines including a brake, a latch therefor, a rack, a lever connected at one end to said rack and at the other end to said latch, and another lever supporting said rack and said first mentioned lever and movable by the tone arm.

13. An automatic stopping device for talking machines including a brake, a latch therefor, a rack, a lever connected at one end to said rack and at the other end to said latch, another lever supporting said rack and said first mentioned lever and movable by the tone arm, said rack also being movable by the record rotating means, and means for preventing said last mentioned movement for a predetermined amount of movement of the rack by the tone arm.

14. An automatic stopping device for talking machines including a brake, a latch therefor, a rack, a lever connected at one end to said rack and at the other end to said latch, another lever supporting said rack and said first mentioned lever and movable by the tone arm, a pawl for moving said rack independently of the tone arm movement, and means controlled by the tone arm position for preventing said pawl from such independent movement for a predetermined amount of tone arm movement.

15. An automatic stopping device for talking machines including a ratchet wheel, a pawl to rotate the same, a second ratchet wheel concentric with the first, a rack for rotating said second ratchet independently of the first, means on the first ratchet for rotating said second ratchet by the first but permitting the overrunning of said second ratchet, said rack being movable by the tone arm, and a brake operable when the tone arm has stopped moving.

16. An automatic stopping device for talking machines including a ratchet, a pawl engaging the teeth of said ratchet to rotate the same, a second ratchet concentric with the first, a rack for rotating said second ratchet independently of the first means on the first ratchet for rotating said second ratchet by the first but permitting the overrunning of said second ratchet, said rack being movable by the tone arm, a brake operable when the tone arm has stopped moving, and a control for removing the pawl from engagement with the first ratchet to permit reverse rotation of a ratchet and the rack.

17. An automatic stopping device for talking machines including a ratchet, a pawl engaging the teeth of said wheel to rotate the same, a second ratchet concentric with the first, a rack for rotating said second ratchet independently of the first, means on the first ratchet for rotating said second ratchet by the first but permitting the overrunning of said second ratchet, said rack being movable by the tone arm, a brake operable when the tone arm has stopped moving, and a control for moving said pawl to a non-wheel engaging position to permit a ratchet and said rack to be reversely rotated and for simultaneously moving said brake into non-braking position.

18. An automatic stopping device for a talking machine having a movable tone arm and a record rotating means, including in combination a wheel movable with the record rotating means, a second wheel having the same center as the first wheel and movable with the tone arm and at the same or increased angular velocity, a brake and a brake releasing mechanism operable by the second wheel when the angular velocity of the first wheel exceeds that of the second wheel.

19. An automatic stopping device for a talking machine having a movable tone arm and a record rotating means, including in combination a wheel movable with the record rotating means, a second wheel having the same center as the first wheel, a lever for moving said second wheel and movable with the tone arm, a brake and a brake releasing mechanism pivotally supported on said lever eccentrically of the lever support and releasable by the movement of the second wheel when the speed of the latter is less than the speed of the first wheel.

20. An automatic stopping device for a talking machine having a movable tone arm and a record rotating means, including in combination a supporting plate, a gear wheel rotatably supported thereby and movable with the record rotating means, a second wheel having the same center as the first wheel, a lever for moving said second wheel and movable with the tone arm, said second mentioned wheel being normally movable at the same or increased angular velocity, a brake, a brake releasing mechanism supported on said lever eccentrically of the lever support and releasable by the second wheel when the angular velocity of said first wheel exceeds that of the second wheel.

21. A stop mechanism for phonographs comprising in combination a plate, a tripping lever movably supported thereon, a brake setting member movably supported by said plate, a brake supporting member pivotally supported by said plate and positioned intermediate the tripping lever and the brake setting member, a portion of which is engaged by said brake setting member and adapted to be thrown into a locking engagement with the tripping lever, a spring for maintaining said locking engagement, and a brake carried by said pivoted brake supporting member and adapted to be thrown by the disengagement of said tripping lever and said brake supporting member.

22. A stop mechanism for phonographs including a tone arm and turn table, comprising in combination a plate, a tripping lever movably supported thereon, a brake setting member movably supported by said plate, a brake supporting member pivotally supported by said plate and positioned intermediate the tripping lever and the brake setting member, a portion of which is engaged by said brake setting member and adapted to be thrown into a locking engagement with the tripping lever, a spring for maintaining said locking engagement, a brake carried by said pivoted brake supporting member and adapted to be thrown by the disengagement of said tripping lever and said brake supporting member, and means operable by the difference in movement between the turn table and the tone arm for tripping the tripping lever in opposition to said spring.

23. An automatic stopping device for a talking machine having a movable tone arm and a record rotating means, including in combination a wheel movable with the record rotating means, a second wheel having the same center as the first wheel and movable with the tone arm and at the same or increased angular velocity, a brake, a rack, a pinion driven by the second wheel, and a brake release operable when the rack is driven by the pinion.

24. An automatic stopping device for a talking machine having a movable tone arm and a record rotating means, including in combination a wheel movable with the record rotating means, a second wheel having the same center as the first wheel, a lever for moving said second wheel and movable with the tone arm, a brake, a second lever pivotally supported on said first lever and eccentrically of the lever support, a pinion driven by the second wheel, a rack adapted to mesh with said pinion, said rack and said second lever being movable by the first lever, and a brake release connected to said second lever and movable thereby when the rack is driven by the pinion.

In witness whereof, I have hereunto affixed my signature.

JOHN SCHILD.